(12) United States Patent
Beaven et al.

(10) Patent No.: US 12,447,221 B2
(45) Date of Patent: Oct. 21, 2025

(54) FLOOR CLEANING AND DISINFECTING ROBOT

(71) Applicant: Carnegie Robotics, LLC, Pittsburgh, PA (US)

(72) Inventors: Daniel King Beaven, Pittsburgh, PA (US); Coleman Scott Knabe, Pittsburgh, PA (US); David Larose, Pittsburgh, PA (US); Troy Edward Tancraitor, Pittsburgh, PA (US); David R. Wozny, Pittsburgh, PA (US)

(73) Assignee: Carnegie Robotics, LLC, Pittsburgh, PA (US)

( * ) Notice: Subject to any disclaimer, the term of this patent is extended or adjusted under 35 U.S.C. 154(b) by 232 days.

(21) Appl. No.: 17/241,686

(22) Filed: Apr. 27, 2021

(65) Prior Publication Data

US 2021/0330846 A1 Oct. 28, 2021

Related U.S. Application Data

(60) Provisional application No. 63/016,010, filed on Apr. 27, 2020.

(51) Int. Cl.
*A61L 2/24* (2006.01)
*A47L 9/28* (2006.01)
(Continued)

(52) U.S. Cl.
CPC .............. *A61L 2/24* (2013.01); *A47L 9/2826* (2013.01); *A47L 9/2852* (2013.01); *A47L 9/2894* (2013.01); *A47L 11/4011* (2013.01); *A47L 11/4036* (2013.01); *G05D 1/0219* (2013.01); *G05D 1/0223* (2013.01);
(Continued)

(58) Field of Classification Search
CPC .... A61L 2/24; A61L 2202/14; A61L 2202/16; A61L 2202/17; A61L 2202/25; A47L 9/2826; A47L 9/2852; A47L 9/2894; A47L 11/4011; A47L 11/4036; A47L 2201/04; A47L 2201/06; A47L 11/24;
(Continued)

(56) References Cited

U.S. PATENT DOCUMENTS

2004/0204792 A1\* 10/2004 Taylor ................... A47L 9/2805
700/245
2005/0022330 A1\* 2/2005 Park ..................... G05D 1/0246
15/319
(Continued)

FOREIGN PATENT DOCUMENTS

CN 108245090 A 7/2018
JP H05324060 A \* 12/1993
(Continued)

OTHER PUBLICATIONS

JP H05324060 A Written Description (Year: 1993).\*
(Continued)

*Primary Examiner* — Douglas Lee
(74) *Attorney, Agent, or Firm* — Workman Nydegger (57) ABSTRACT

An assembly of a self-propelled floor cleaning unit and a floor disinfecting unit. The floor disinfecting unit may be detachably attached to the floor cleaning unit. The areas covered by the floor cleaning unit and floor disinfecting unit may be logged and reported.

33 Claims, 1 Drawing Sheet

(51) Int. Cl.
*A47L 11/40* (2006.01)
*G05D 1/00* (2024.01)

(52) U.S. Cl.
CPC ....... *A47L 2201/04* (2013.01); *A47L 2201/06* (2013.01); *A61L 2202/14* (2013.01); *A61L 2202/16* (2013.01); *G05D 1/0214* (2013.01)

(58) Field of Classification Search
CPC .. A47L 11/405; G05D 1/0219; G05D 1/0223; G05D 1/0214; G05D 2201/0203
See application file for complete search history.

(56) References Cited

U.S. PATENT DOCUMENTS

| | | | | |
|---|---|---|---|---|
| 2007/0016328 | A1* | 1/2007 | Ziegler | ................ B60R 19/483 318/609 |
| 2011/0132402 | A1* | 6/2011 | Ickes, III | ................ A47L 11/24 134/58 R |
| 2012/0305787 | A1 | 12/2012 | Henson | |
| 2014/0330452 | A1 | 11/2014 | Stewart | |
| 2015/0367008 | A1 | 12/2015 | Romo et al. | |
| 2018/0000306 | A1* | 1/2018 | Caruso | .................... A47L 11/28 |
| 2018/0193504 | A1 | 7/2018 | Kreiner et al. | |
| 2018/0344116 | A1* | 12/2018 | Schriesheim | ......... A47L 9/2894 |
| 2019/0223677 | A1* | 7/2019 | Yoon | ..................... A47L 11/293 |

FOREIGN PATENT DOCUMENTS

| | | | | |
|---|---|---|---|---|
| RO | 201500045 | U1 | 7/2018 | |
| WO | 2013191465 | A1 | 12/2013 | |
| WO | 2015189615 | A1 | 12/2015 | |
| WO | WO-2019231241 | A1 * | 12/2019 | ........... A47L 11/282 |
| WO | 2020060507 | A1 | 3/2020 | |

OTHER PUBLICATIONS

WO-2019231241-A1 Written Description (Year: 2019).*
JPH05324060A machine translation (Year: 1993).*
WO2019231241A1 machine translation (Year: 2019).*
Extended European Search Report from corresponding European Application No. 21170655.1, Sep. 16, 2021.

* cited by examiner

FLOOR CLEANING AND DISINFECTING ROBOT

BACKGROUND

The present invention relates to a robot for cleaning and disinfecting a floor or other surface. The robot has means for cleaning a floor as well as means for disinfecting the floor.

Relevant technology may be seen in US2014/0330452, US2012/0305787, US2015/0367008, WO15/189615, US2018/0193504, RO2015/00045 and WO2020/060507.

SUMMARY

In a first aspect, the invention relates to a system for cleaning and disinfecting surfaces, the system comprising a self-propelled unit comprising a surface cleaning element, a surface disinfecting element and a controller, the controller being configured to:
determine a first area of a surface cleaned by the surface cleaning element, and
determine a second area of the surface disinfected by the surface disinfecting element.

In the present context, the cleaning a surface may comprise washing the surface, vacuuming the surface, brushing the surface to remove dry debris or the like. After cleaning, the surface preferably has less debris, deposits or the like. The cleaned surface may be dry or wet.

Disinfecting the surface preferably comprises killing germs, bacteria and/or viruses deposited on the surface. The germs/bacteria/viruses may be deposited on the surface in or on other substances, such as body fluids, food waste, liquids or the like. Disinfection may be obtained by e.g. irradiating the surface by disinfecting radiation, such as UV radiation, such as UV-C radiation, X-ray radiation or the like. Disinfection may alternatively or additionally be obtained by heating, cooling, drying or the like. Other types of disinfection may be launching ionizing particles or other types of particles, such as Ag ions toward the surface.

The surface may be any surface but will typically be a floor or other horizontal surface.

A self-propelled unit is a unit which is capable of moving by itself. The unit may comprise motors or the like for causing the movement. The unit may comprise its own power source, such as a battery, fuel cell or the like, as well as a controller configured to control the movement. Many self-propelled units may be robots and/or may comprise sensors enabling the units to detect obstacles and move in relation thereto.

A controller may be any type of circuit or the like, such as an ASIC, FPGA, DSP, processor, microprocessor, software controlled or hardwired. The controller may be an assembly of such elements interconnected to communicate with each other. Clearly, some portions of the controller and/or portions of the operation thereof may be performed remotely, such as in the cloud.

The controller is configured to:
determine a first area of a surface cleaned by the surface cleaning element, and
determine a second area of the surface disinfected by the surface disinfecting element.

The controller may be able to determine e.g. the first area from knowledge of how the unit has moved in relation to the floor. The unit thus may have sensors enabling the controller to determine relative movement between the unit and the surface. Such sensors may be GPS, GNSS, Radar, lidar, sonar, stereo vision, camera-based, odometer, triangulation of wireless signals, or the like—or combinations thereof.

The controller may additionally be provided with information as to a relative position of the cleaning element and the disinfecting element relative to e.g. wheels of the unit. Thus, knowing the positions of the wheels as well as how the unit handles, such as which wheels are turned to allow the unit to turn, will allow the controller to determine the position, of the cleaning element and the disinfecting element, and thus the areas covered thereby.

Clearly, other manners of moving may be used, such as crawling, legs, tracks or the like.

It is noted that the path taken by the disinfecting element need not be identical to that taken by the cleaning element. This may have an impact on the quality of the disinfection and may be determined from a difference between the first and second areas.

It may be desired that the surface is first cleaned and then disinfected. A non-cleaned surface may comprise larger portions or thicker portions, such as thicker layers of body fluids, larger chunks of food waste, which will take a long time to disinfect. Thus, if the surface is first cleaned, such large portions may be removed or reduced to small portions, such as thin layers, which are more swiftly disinfected. Thus, a faster processing is possible, and the unit may move over the surface at a higher velocity.

Naturally, this cleaning may also be directed to killing germs/bacteria/viruses, such as when a cleaning solution comprises detergents, bleach, biocides, antibiotics, or the like. Many types of cleaning solutions also comprise agents attacking germs.

Preferably, the surface cleaning element and the surface disinfecting element are positioned at different positions along the direction of movement. In this connection, the relevant portions of the cleaning element and the disinfecting element are the portions engaging the surface and/or engaging the surface or dirt/bacteria/germs/viruses thereon. For example, the relevant portion of a sweeper/vacuuming unit is the opening for the air inflow or an area of the surface from which dirt is removed by the vacuuming. The relevant portion of an emitter of disinfecting radiation is the actual emitter thereof or an area of the surface on to which the radiation is directed.

The direction of movement is the predominant direction of movement of the unit. The unit may comprise multiple cleaning elements, such as a scrubber, which leaves liquid on the surface, and a squeegee, which collects this liquid for it to be sucked away from the surface. The predominant direction of movement then is that where the squeegee follows the track of the scrubber. Alternatively, the unit may comprise a sweeping/brushing unit and a vacuuming unit, where the direction of movement then is that the vacuuming unit follows the sweeping/brushing unit.

Clearly, the position of the cleaning element and/or the disinfecting element may not be a mathematical point on the direction but rather has an extent along the direction, such as when projected on to the direction. In this situation, the cleaning element has at least a portion position farther in the direction than any portion of the disinfecting element, and the disinfecting element has a portion which is behind any portion of the cleaning element. Often, however, all portions of the cleaning element are positioned in front of all portions of the disinfecting element.

Clearly, when the unit turns, the path taken by the cleaning element will differ from that taken by the disinfecting element. This may be determined by the controller and taken into account when determining the areas.

In this context, the handling or turning of the unit may be of interest. The area covered by the cleaning element will depend on the axis around which the turning takes place. Also, it may be relevant whether, if the unit has wheels, the front wheels or the back wheels turn. Thus, a model, such as a kinematic model, may be made based on this. The model may be used for determining the different areas and potentially an overlap thereof or portions where there is no overlap.

In one embodiment, the controller is additionally configured to:
   determine that one portion of the surface disinfecting element moves over a surface with a higher velocity than another portion of the disinfecting element and
   vary a velocity of the self-propelled unit vis-à-vis the surface.

Depending on the type of disinfection, it may be desired to determine a minimum dose or minimum time required for each portion of the surface in order to achieve a desired level of disinfection. This minimum dose or time may be determined based on the degree to which the cleaning element cleans the surface. Alternatively, it may be determined based on characteristics of the germs/bacteria/viruses desired killed.

Thus, if the velocity of one portion of the disinfecting element is too high for suitable disinfection, the velocity of the self-propelled unit may be reduced.

In general, the dose delivered may be determined from the intensity output toward the surface by e.g. integrating the intensity emitted toward the surface part over time.

Actually, it may also be desired to set a maximum dose or time, as disinfecting agents, radiation or the like may also affect the surface or the material thereof.

Then, when one portion of the surface disinfecting element moves with a higher velocity than the other portion, such as when the surface disinfecting element is not translated linearly but along a curve, it may be desired to control the velocity so that the minimum dose/time is observed.

In general, it may also be desired to ensure that one or more portions of the surface receive a combined intensity or dose which is below a predetermined maximum dose or intensity. Some materials discolour or deteriorate, such as age, too much if irradiated by a too high intensity or a too high dose. Then, it may be desired to also control the disinfecting element to limit the intensity output to observe the maximum limit. This is described further below.

Alternatively, the disinfecting element may adapt the disinfection to the different velocities so that portions of the disinfecting element moving with higher velocities disinfect with a higher intensity.

In an alternative embodiment described further below, the disinfecting element may itself be able to determine the velocity with which it moves over the surface and adapt the intensity of the disinfection thereto. Then, if different portions of the disinfecting element move with different velocities over the surface, different portions of the disinfecting element may disinfect with different intensities.

Below, different positions of the disinfecting element, relative to the cleaning element or the unit are described. Described is also relative movement there between and the attachment thereof.

In one embodiment, the disinfecting element is configured to output information relating to an intensity or amount of disinfecting substance or radiation output, the controller being configured to base the determination of the second area on this information. In this manner, also the degree of disinfection may be logged together with e.g. position data so that a report may be made illustrating not only the area covered but also the disinfection quality or degree, or the intensity or dose delivered. A dose may be determined from the intensity delivered and the period of time during which the intensity was delivered.

In one embodiment, as mentioned above, the controller is configured to control movement of the self-propelled unit and control operation of the disinfecting element. The controlling of the disinfecting element may be turning on/off of the disinfection. Also an intensity of the disinfection may be controlled, as may the intensity of separate portions of the disinfecting element, such as for the reasons described above. As will be described below, also an angle or rotation, such as in a horizontal plane, of the disinfecting element vis-à-vis the cleaning element may be controlled if desired.

In one embodiment, the controller is configured to output information relating to the first and second areas. This information may relate to an overlap or a lack of overlap of the two areas. As described above, the information output may also relate to a dose delivered to different portions of the second area. Also, the cleaning quality may be added to the information. Often, cleaning robots are able to determine the degree of cleaning from e.g. the concentration of debris vacuumed or the degree of dirt in the water sucked from the surface. This information may be added to the information output.

The advantage of this information is that it may be used as an indication of the cleanliness and degree of disinfection of the surface. A lower degree of cleaning may render the disinfection less efficient, as bacteria and the like may be present in e.g. thicker layers of fluids, which cannot be sufficiently disinfected by the degree of disinfection delivered.

This report may serve as a quality or cleanliness proof, which could be of value in hospitals, nursing homes, doctors consultancies, public places, such as airports, town halls and the like, as well as in shops, shopping malls, storage facilities, shops, factories and the like.

A second aspect of the invention relates to a method of cleaning and disinfecting a surface, the method comprising:
   moving a system according to the first or third aspects of the invention over the surface while the surface cleaning element cleans the surface and the surface disinfecting element disinfects the surface and
   during the moving step or subsequent thereto:
   determining a first area of a surface cleaned by the surface cleaning element, and
   determining a second area of the surface disinfected by the surface disinfecting element.

Naturally, the areas covered may be determined during the cleaning/disinfecting step. The actual positions of the cleaning element and/or the disinfecting element may be determined and/or tracked so that the area(s) is/are determined as the system moves over the surface. Alternatively, the positions may be tracked and the areas determined subsequently.

Clearly, the above and below aspects may be combined. Thus, all above and below embodiments, situations and the like may be interchanged between the aspects.

In one embodiment, the method further comprises the steps of:
   determining that one portion of the surface disinfecting element moves over a surface with a higher velocity than another portion of the disinfecting element and
   varying a velocity of the self-propelled unit and/or the disinfecting element vis-à-vis the surface.

In that or another embodiment, the method further comprises the step of outputting information relating to an intensity or amount of disinfecting substance or radiation output. Then, the step of determining the second area comprises determining the determination of the second area on this information. Alternatively, this information may be logged together with the area or position data as described above and below.

Usually, the method would also comprise controlling operation of the disinfecting element, such as turning on/off of the disinfecting as well as potentially also controlling a degree or intensity of disinfecting or perhaps a manner of disinfecting. It may be desired that the disinfecting element is capable of disinfecting in multiple manners, such that different surfaces, surface materials or the like may be disinfected or different velocities may be used with different disinfecting manners. Then, the manner of disinfecting may be selected based on a position or surface or other parameters. Different disinfecting manners may be different types of radiation emitted, different intensities emitted, the emission of radiation or of disinfecting ions, the emission of disinfecting radiation and the emission of steam, or the like.

As mentioned, the method preferably further comprises the step of outputting information relating to the first and second areas. This may be in the form of a report indicating which areas are cleaned and which areas are disinfected. Alternatively, the information may related to areas not disinfected. This information may be added information of a degree of disinfection in different portions of the second area. This information may be determined based on a disinfection intensity determined at different positions or portions of the second area. Similar information may be added for the first area and a degree of cleaning of different portions of the first area.

A third aspect of the invention relates to an assembly comprising:
 a self-propelled unit having a main direction of movement,
 a surface cleaning element connected to the self-propelled unit,
 a surface disinfecting element detachably connected to the self-propelled unit, the surface disinfecting element connected to the self-propelled unit behind the surface cleaning element in the main direction of movement.

As mentioned above, the aspects, embodiments, situations and the like of the invention may be interchanged and swapped. For example, the present assembly may be used in the method of the second aspect or as the unit or system of the first aspect.

The self-propelled unit may be the unit of the first aspect. The unit is able to move and may be autonomous. The unit usually will have a power source and motors for causing the movement. The unit may have sensors and the like for making autonomous movement possible, such as for detecting obstacles.

The unit has a main direction of movement, which may be defined by e.g. the surface cleaning element(s).

The surface cleaning element may be as described above. The surface usually is horizontal and is often a floor.

The surface cleaning element is connected to the self-propelled unit. This connection may be permanent but is often detachable, as surface cleaning elements may become worn or dirty and thus may need replacing or removal for cleansing.

The surface disinfecting element may be configured to perform any type of disinfection. Many different types of disinfection are known, some of which are described above.

The surface disinfecting element is detachably connected to the self-propelled unit. A detachable connection may be based on a hook or any physical connection that may be reversed without damage to the surface disinfecting element or the unit. Engagement means may be provided on the unit engaging with engagement means of the disinfecting element, such as is known from vehicles, cars, trailers, trains, or in the industry such as cable/chain connections, or the like.

The connection is able to transfer torque and/or force from the unit to the disinfecting element so that the disinfecting element may be moved by the unit. The connection may also transfer power and/or information between the unit/element.

It may be preferred that the connection allows the element to rotate relative to the unit, such as around a horizontal axis. In this manner, an uneven surface may not cause a distance from the element to the surface to vary, even if the unit tilts slightly.

The surface disinfecting element is connected to the self-propelled unit behind the surface cleaning element in the main direction of movement. In this manner, the disinfecting unit will cover portions of the surface which have been cleaned by the surface cleaning element. The advantages thereof are described above.

In one embodiment, the surface disinfecting element is connected to the self-propelled unit behind the self-propelled unit in the main direction of movement. In this manner, the unit need not take up space in/under the self-propelled unit. In fact, the self-propelled unit may be a surface cleaning unit in its own right. The disinfecting element may then be post-fitted to this unit and may be detached when no disinfection is desired.

In one embodiment, as is also described above, the surface cleaning element comprises one or more of the group consisting of: a scrubber, a squeegee, a sweeper, and a vacuum unit. Multiple of these elements may be used.

The surface disinfecting element is preferably configured to output disinfecting radiation, such as UV, UV-C, X-ray or the like.

As described above, a challenge may be seen when the unit turns, as the cleaning element and the disinfecting element may then not cover the same portions of the surface. Naturally, this may simply be noted and logged and thus clear from a lack of overlap between the first and second areas.

In another situation, the surface disinfecting element may comprise:
 a frame attachable to the self-propelled unit and
 a disinfecting portion connected to the frame and configured to disinfect the surface,
 wherein the disinfecting portion is configured to be translated, relative to the frame, in a direction at an angle to the main direction of movement.

In this manner, the disinfecting portion or unit may be translated to stay over the area covered by the cleaning element also during turns of the unit, system or assembly.

In one embodiment, the surface disinfecting element is configured to receive power from the self-propelled unit. This makes the disinfecting element simpler and cheaper, and often the unit is equipped with a substantial power source, such as a battery.

In another situation, the surface disinfecting element comprises a power source, such as a battery, solar panels or a fuel cell. This has the advantage that power need not be derived from the unit which may then not be altered in any other manner than allowing attachment of the disinfecting element. When no cable connection is required, no re-certification of the self-propelled unit is required.

As is mentioned below, any instructions from the self-propelled unit may then be transferred wirelessly.

In one situation, the surface disinfecting element is configured to receive controlling information from the self-propelled unit and to disinfect the surface accordingly. This controlling information may relate to a velocity of the unit or element. The disinfecting element may then adapt a disinfecting intensity to that velocity in order to ensure that a minimum dose or disinfection is obtained. It may also be desired to keep the dose or intensity below a limit. The unit may turn the disinfection on/off, such as if passing areas where disinfection is not desired or when stopped. The unit may also or alternatively forward information to the disinfecting element that the unit is turning. In this situation, a sideward translation may be desired of portions of the disinfecting element. A turning will also make some portions of the disinfecting element move faster over the surface than others. This is described above.

In one embodiment, the disinfecting element comprises sensing means for determining a velocity of the disinfecting element vis-à-vis the surface and to control the disinfection of the surface accordingly. Thus, instead of receiving such information from the unit, the disinfecting element may itself obtain such information and adapt the disinfection accordingly. Numerous movement detectors are described above.

Naturally, such sensing means could be configured to determine the relative velocity of the surface and each of a first and a second portion of the disinfecting element and to control the disinfection of the surface in accordance with the relative velocities.

In one embodiment, the surface disinfecting element is connected to the self-propelled unit so as to not be rotatable to any significant degree around a vertical axis. The disinfecting unit may be fixed to the unit so that it needs no separate elements for supporting it against gravity. Alternatively, wheels, sliders or the like or the like may be provided in the element for supporting the element against gravity. Such wheels may also have the advantage that they assist in ensuring that a predetermined distance exists between the element and the surface. When no rotation is allowed around a vertical axis, the direction of the disinfecting element in the horizontal plane is defined by the direction of the unit, which may make the determination of the second area simpler.

In another situation the surface disinfecting element is connected to the self-propelled unit so as to be rotatable around a vertical axis. As described above, this may allow the disinfecting element to cover a wider area during turns. This rotation naturally may be taken into account when determining the second area.

A fourth aspect of the invention relates to a method of cleaning and disinfecting a surface, the method comprising moving an assembly according to the third aspect or a system according to the first aspect over the surface while the surface cleaning element cleans the surface and the surface disinfecting element disinfects the surface.

In one embodiment, the method comprises the initial step of detachably connecting the disinfecting element to the self-propelled unit behind the self-propelled unit in the main direction of movement. Then, the cleaning/disinfecting may take place as described. The unit may perform the same cleaning action as it would if the disinfecting element was not attached.

In one situation, the cleaning step comprises one or more of the group consisting of: a scrubbing step, a step of sucking liquid from the surface, a sweeping step, and a vacuuming step.

In one situation, the surface disinfecting step comprises outputting disinfecting radiation, such as UV, UV-C, X-ray or the like.

In one situation, the surface disinfecting element comprises:
 a frame attachable to the self-propelled unit and
 a disinfecting portion connected to the frame and configured to disinfect the surface,
the method further comprising the step of translating the disinfecting portion, relative to the frame, in a direction at an angle to the main direction of movement.

The method may further comprise the step of the surface disinfecting element receiving power from the self-propelled unit.

In another situation, the disinfecting element receives power from a power source of the disinfecting element.

In one embodiment, the surface disinfecting element receives controlling information from the self-propelled unit and disinfecting the surface accordingly, such as via a wireless link.

In one embodiment, the disinfecting element determines a velocity of the disinfecting element vis-à-vis the surface and controls the disinfection of the surface accordingly.

In one embodiment, the relative velocity of the surface and each of a first and a second portion of the disinfecting element is determined and the disinfection of the surface is controlled in accordance with the relative velocities.

In one embodiment, the surface disinfecting element is prevented from rotation, relative to the self-propelled unit, to any significant degree around a vertical axis.

In another embodiment, the surface disinfecting element rotates, relative to the self-propelled unit, around a vertical axis.

A fifth aspect of the invention relates to an assembly of a self-propelled unit and a disinfecting element, wherein the assembly comprises a determining element configured to determine a velocity of the disinfecting element over a surface and for controlling the disinfection of the disinfecting element on the basis of a determined velocity.

Clearly, all aspects, embodiments, situations and the like may be derived from any aspect. The self-propelled unit and disinfecting element may be as described above or below. By determining the velocity of the disinfecting element over the surface, this intensity may be adapted to the velocity. As described above, a minimum intensity or dose may be desired to achieve a sufficient disinfection. This minimum value may depend on the nature or properties of the surface. For example, if the surface is porous, a higher intensity or dose may be desired.

The determination or sensing of a velocity is described above.

Also, a maximum intensity or dose may be set, so that the intensity output from the disinfecting element may be adapted to arrive, for one or more, preferably all, surface portions to receive the desired disinfection.

Thus, not only can the intensity be determined from the velocity at which the disinfecting element moves vis-à-vis the surface but also to unexpected events.

In one embodiment, the self-propelled unit comprises one or more sensors for detecting obstacles and wherein the determining element is configured to instruct the disinfecting element to stop disinfecting when the self-propelled unit stops due to a detected obstacle.

If the self-propelled unit has to stop or slow down for an obstacle, such as a person, the disinfecting element may be controlled accordingly so that the surface still gets the desired disinfection.

A sixth aspect of the invention relates to a method of operating an assembly of a self-propelled unit and a disinfecting element to disinfect a surface, the method comprising determining a velocity of the disinfecting element over the surface and controlling the disinfection of the disinfecting element on the basis of a determined velocity. In this situation, the controlling may be the controlling of an intensity of output disinfecting substance/radiation or the like.

The controlling may be a controlling of the intensity, (on, off, lower intensity, higher intensity) of the disinfection.

In one embodiment, the method further comprises the steps of self-propelled unit detecting an obstacle and the disinfecting element stopping disinfecting. Naturally, a lowering of the intensity may be opted for if the self-propelled unit stops or slows down. If the self-propelled unit instead merely re-directs, the disinfection may be continued as before.

On the other hand, if the self-propelled unit opts to reverse a certain distance to get farther away from the obstacle, the disinfecting may be turned of, as it may re-trace a track where it already has been.

A seventh aspect of the invention relates to an assembly comprising:
a self-propelled unit having:
an instruction outputting element for outputting wireless instructions and
a surface cleaning element,
a surface disinfecting element detachably connected to the self-propelled unit and comprising:
a power source and
a receiver for receiving wireless information from the instruction outputting element and for controlling the disinfecting operation of the disinfecting element based on wireless instructions received.

In this context, wireless information transfer may be obtained using any wireless protocol, such as WiFi, Bluetooth or the like. Receivers/emitters of wireless information may be antennas, or the like. The wireless information may be transferred using e.g. RF signals, optical signals or the like.

When the disinfecting element also has a power source, it may need no electrical connections to the self-propelled unit. The self-propelled unit may then merely need a physical connection to be able to push/pull the disinfecting element. Then, no re-certification may be required when generating this assembly.

The instructions for the disinfection element may relate to a velocity of the self-propelled unit, as this may also be the velocity of the disinfecting element. Then, the disinfecting element may not itself need a velocity sensor. From this velocity, the disinfecting element may determine how to disinfect the surface, such as with which intensity to disinfect.

In addition or alternatively, the information from the unit may relate to a turning thereof, as this may decrease the velocity of some portions of the disinfecting element vis-à-vis the surface while it may increase the relative velocity for other portions of the disinfecting element. Thus, this information may be used for adapting the intensity of these portions to the turning.

Above, a translation is described which may increase the overlap of the areas covered by the cleaning element and the disinfecting element. This movement may also be controlled by the disinfecting element based on the information.

Alternatively, the disinfecting element may itself have a velocity sensor and/or an angle sensor so that no information is required from the unit to the element.

An eighth aspect of the invention relates to a method of operating an assembly comprising:
a self-propelled unit having:
an instruction outputting element for outputting instructions and
a surface cleaning element,
a surface disinfecting element detachably connected to the self-propelled unit and comprising:
a power source and
a receiver for receiving information and for controlling the disinfecting operation,
the method comprising the steps of:
the instruction outputting element outputting wireless instructions,
the receiver receiving the wireless instructions and controlling the disinfecting operation in accordance with the instructions.

As described, the controlling of the disinfection may be an increasing or decreasing, or an on/off of the disinfection, which may be relating to a velocity of the self-propelled unit.

The self-propelled unit may itself determine how much to increase/reduce the intensity, or it may simply output the velocity thereof relative to the surface. In the latter situation, the disinfecting element may then determine the intensity from the velocity.

A ninth aspect of the invention relates to a method of determining a path for a self-propelled unit comprising a surface cleaning element and a surface disinfecting element for cleaning and disinfecting a surface, the method comprising determining the path so that both the cleaning element and the disinfecting element cover at least 90% of an area of the surface.

From the above, it is clear that when attaching a disinfecting element to a self-propelled unit, the path of the cleaning element and the disinfecting element are not identical. Thus, the path determined for the self-propelled unit as determined for the cleaning element only will not result in a desired disinfecting of the surface. Thus, the desired path for the self-propelled unit to take needs adapting. This amended path may then be determined from the overlap between the path taken by the disinfecting element and that taken by the cleaning element. This may require the determination of a path where e.g. the cleaning element covers the same surface portion multiple times. This may increase the time required for both cleaning and disinfecting the surface.

Then, it may be desired to determine a path, especially in turns or non-straight portions, where a more narrow path width is determined.

In one embodiment, the path is determined so that both the cleaning element and the disinfecting element cover at least 95% of an area of the surface.

Naturally, the method may further comprise controlling the unit to follow the path.

BRIEF DESCRIPTION OF THE DRAWINGS

In the following, preferred embodiments of the invention will be described with reference to the drawing, wherein.

DETAILED DESCRIPTION OF VARIOUS EMBODIMENTS

Figure 1:
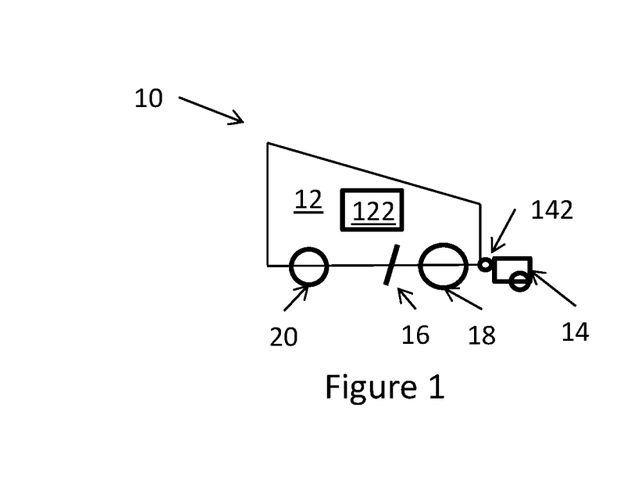
FIG. 1 illustrates a first embodiment of a system according to the invention.

In FIG. 1, a self-propelled floor mopping robot 12 is seen having a body on which wheels 18/20 are mounted as well as a floor cleaning element 16, which may be a mop, a scrubber, a vacuum unit, a squeegee, a brush or the like. The floor cleaning may be a vacuuming, a washing, a scrubbing, a brushing or the like.

In the following, the robot is described as a floor cleaning robot. Naturally, all types of surfaces may be cleaned and disinfected.

The robot typically will have a controller 122 and sensors enabling the robot to manoeuvre around in rooms and the like. Usually such robots have or generate maps of some obstacles but are able to identify these to find their way around while detecting additional obstacles, such as persons, so as to not bounce into such obstacles but find its way around them. Sensors for such use are described above.

Behind the robot 12, a disinfecting unit 14 is attached via a connection 142. The disinfecting unit 14 may be a UV radiating unit, a liquid/gas spraying unit, a unit configured to emit Ag ions or the like. A large number of manners exist of killing germs, bacteria and/or viruses, such as by radiation (UV, X-ray), bactericides, ions or the like. In the following the disinfecting is exemplified by radiation. Clearly, any of the other manners may equally well be used.

The disinfecting unit 14 may be detachably attached to the robot 12 which then may be a standard or known floor cleaning robot. The disinfecting unit 14 may be self-contained in the sense that it does not even require power from the robot 12. Alternatively, the unit 14 may receive power from the robot 12.

Naturally, the unit 14 may be configured to output a constant intensity of the disinfecting radiation. This intensity may be adapted by increasing/decreasing a power fed tot a radiation emitter or by altering the period if the emitter is fed a pulse width modulated signal. This may be over time as well as—or alternatively—along a length thereof and/or an area covered thereby.

The dose output may be variable, however, both over time and/over or from different portions of the unit 14. In one example, different portions of the unit are not moved with the same velocity over a surface. Thus, the portion moving faster may be controlled to emit a higher dose or intensity in order for all portions of the floor to receive at least a minimum dose of the disinfecting radiation. The unit 14 may comprise a number of individually controllable emitters, such as positioned sequentially along a direction perpendicular to the usual direction of movement of the robot.

It may be desired that the disinfecting unit disinfects a width, perpendicular to the direction of movement of the robot, which is at least the width of the floor which the cleaning element cleans. It may be preferred that the disinfected width is larger than the cleaned width. Then, if it is ensured that the floor is cleaned, it will automatically also be disinfected.

Figure 2:
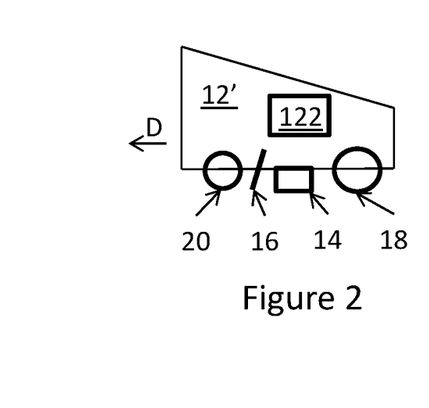
FIG. 2 illustrates a second embodiment of a system according to the invention.

Naturally, the unit 14 may be provided in other positions on the robot 12. In FIG. 2, the unit 14 is positioned below the robot 12 close to the position of the floor cleaning element 16. Then, the unit 14 may not be easily detachable.

The overall advantage of providing the disinfecting unit 14 clearly is that a standard cleaning of a floor will not kill enough germs, bacteria and viruses, so that a further step of disinfecting the floor may be desired. Also, bacteria and viruses may be deposited on the floor inside droplets or deposits of other matter, such as food left-overs, spit or other body fluids, which naturally will have a certain volume and thickness so that an increased dose of the disinfecting radiation is required to ensure disinfection. Thus, it is preferred that the floor cleaning element 16 passes the floor before the disinfecting unit 14 does, so that most of the bacteria/viruses and the body fluids and the like are removed, and so that any remaining bacteria/viruses are provided in thinner layers of fluids or the like, so that the radiation dose required to disinfect may be lower. In that manner, the robot 12 may move faster while obtaining the desired degree of disinfection.

This offsetting of the cleaning element 16 and the unit 14 thus preferably is along the primary direction of movement D (see FIG. 3) of the robot 12, so that when moving along this direction, the cleaning element 16 cleans the floor before the unit 14 disinfects the floor. However, as the two elements are offset along this axis, any deviations from this direction, such as when the robot turns, will disturb this pattern.

Figure 3:
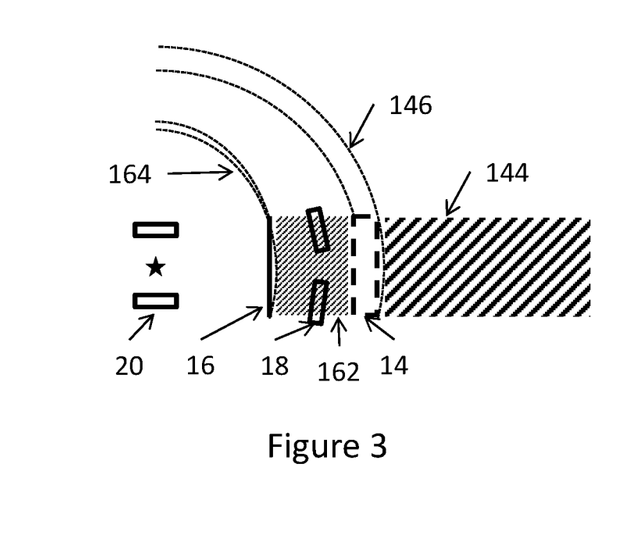
FIG. 3 illustrates the areas covered during turning.

As seen in FIG. 3, rotation of the robot will result in different areas being covered by the cleaning element and the disinfecting unit. In FIG. 3, an extreme case is seen where the robot rotates around a centre (star) between the two front wheels 20.

In this situation, both the cleaning element and the disinfecting unit have covered the area 144, but only the cleaning element has covered the area 162 between the cleaning element and the disinfecting unit.

Often, robots have back wheels with fixed rotation axes and a front wheel driving the robot and being able to have its rotation axis rotated around a vertical axis.

Now the robot turns so that the cleaning element covers the track 164 and the disinfecting unit covers the track 146. Now, areas are seen which are not covered by one of the cleaning element and the disinfecting unit.

In this example, the unit 14 is not rotatable (around a vertical axis) relative to the robot 12. If it was able to rotate, it would cover a wider track 146.

In another embodiment, the unit 14 may be attached to the robot to be rotatable around a vertical axis (as a trailer for a car). In this situation, the unit will cover a wider path during rotation of the robot.

Figure 4:
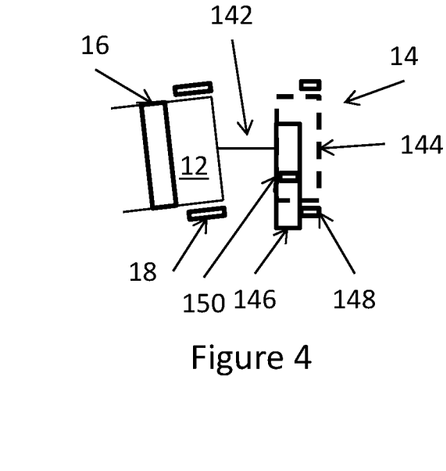
FIG. 4 illustrates translation of the disinfecting portion.

In one embodiment seen in FIG. 4, the unit 14 is attached in a manner so as to be translated horizontally and perpendicularly to the longitudinal direction or axis of the robot. In FIG. 4, the disinfecting element has a frame 144 connected to wheels 148 on which a disinfecting unit 146 is carried. In this situation, the unit 146 may be translated so as to cover the area covered by the cleaning element 16 during turns.

In general, the operation of the unit 14 may be controlled by the robot. In one situation, the operation of the robot may bring about the above-mentioned higher velocity of some portions of the unit 14 over the floor compared to other portions of the unit 14. In that situation, the first portions may be controlled to emit a higher intensity and the other portions a lower intensity. In addition or alternatively, the robot may be controlled to move at a lower velocity to ensure that all portions of the floor receive the minimum dose of radiation.

Also, any rotation or translation of the unit 14 relative to the robot 12 may be controlled by the operation of the robot.

Thus, if the robot is controlled to turn, the unit may be rotated/translated correspondingly.

In fact, the operation of the unit may then be controlled by the controlling of the robot, such as a rotation of a steering wheel or the rotational position of the wheels used for e.g. turning the robot.

Naturally, the unit may also have the radiation intensity turned on/off by the robot, such as when not operating or when passing over an area which is already disinfected.

Then, the unit may receive power and/or instructions from the robot for this operation.

In addition or alternatively, the unit may be autonomous. In one embodiment, the unit may be battery operated to not need any connection to the robot. Also, means may be provided for detecting the velocity of the unit relative to the floor, so that the output intensity may be adapted to e.g. a predetermined dose to be delivered. This sensing may be via wheels supporting the unit in relation to the floor. In fact, such velocity or movement means may also detect whether one portion of the unit moves faster than the other portion, so that the emitted intensity may be varied accordingly over the unit. In another embodiment, the unit may determine its angle vis-à-vis the robot, such as in a horizontal plane, and may determine, on the basis thereof, e.g. a turning diameter of the robot and thus how to control the radiation emission intensity and/or a horizontal translation of at least the radiation emitting elements of the unit as described above.

When fully autonomous, the unit 14 may be attached to any moving element and may then disinfect any surface it is moved over. Naturally, the unit may then have a controller 150 for turning the radiation emission on/off, and optionally controlling it as described above, such as based on output of sensors of wheels or the like.

Even though the unit is fully autonomous, the controller 122 may determine the area covered by the unit, as the movement of the unit is predictable.

If the focus is on disinfection, it may be desired to ensure that all relevant portions of the floor are covered by the unit 14. If parts of the floor are not covered by the cleaning element, it may be desired to drive the robot more slowly when the unit 14 covers such parts in order to allow the disinfecting radiation to disinfect these parts even though such parts are not cleaned and thus may have larger concentrations of bacteria/viruses or the bacteria/viruses may be provided in thicker layers of e.g. body fluids.

In another situation, it may be desired to actually plan the route of the robot so that all relevant portions of the floor are covered by both the cleaning element and the disinfecting unit. This route then will differ from the known situation where the route will relate to the coverage of only the cleaning element 16. For example, the robot may choose to make such turns over portions of the floor which area already covered by both the cleaning element and the disinfecting unit. Alternatively, the robot may track portions not covered by both the cleaning element and the disinfecting unit and ensure that all such portions are covered, before the floor is considered cleaned/disinfected.

Usually, the robot is autonomous and thereby comprises one or more sensors and controllers for determining where the robot is and where obstacles or the like are positioned relative to the robot. Thus, the robot may comprise or build a map over a scene or venue, the floor of which is to be cleaned and disinfected. A scene or venue may be a supermarket, a hospital, an airport gate, a warehouse, a storage facility, a shop or the like. Such scenes or venues may comprise a number of fixed obstacles, such as walls, doorways, pillars, storage racks and the like. Often, the map generated for a scene or venue may be re-used, as such obstacles are not assumed to move. However, a number of other obstacles may also exist in the form of persons, luggage, pallets, furniture and the like. Such obstacles cannot be assumed to remain stationary. Thus, firstly, such obstacles may be preferred not entered in the map of the scene/venue and secondly, sensors may be provided for sensing such unexpected obstacles when the robot negotiates the route.

Often, the robot will be instructed to clean the floor and will then determine a route in the room or the like, where the fixed obstacles are taken into account. The robot may additionally take into account different floor types or different areas thereof which are to be cleaned differently or not at all.

The robot, or especially the cleaning element and/or the unit, will have a predetermined width and the route may comprise portions with parallel paths so that a full width of e.g. an aisle or area may be covered/cleaned and disinfected.

The robot may use the map and output of one or more sensors for determining where it is in the room and in the map so that navigation is possible. This is known.

When the robot moves in the room, unexpected obstacles may be detected. Different reactions may be selected between. If the obstacle is a person, the robot may sound an alarm to have the person move, so that the robot may continue its path. Alternatively, the robot may wait until the obstacle moves. In that situation, the disinfecting unit may be controlled to emit no or less radiation to not over-irradiate a portion of the floor during the wait. Further alternatively, the robot may find its way around the obstacle and then additionally log the deviation from the path as there is now a portion of the floor which was not cleaned/disinfected.

As mentioned, the robot may log or store portions of the floor which are not (yet) both cleaned and disinfected or which is not disinfected after having been cleaned. The robot may thus alter its route to visit or revisit such portions in order to ensure that all relevant portions of the floor are cleaned and then disinfected.

Having performed the cleaning route, the robot may output a final report indicating both the portions of the floor which were cleaned and those which were disinfected. In addition, the report may comprise a heat map or intensity map indicating the intensity or dose which was delivered to different portions of the floor. This may serve as documentation of the cleaning of the floor. This may be desired by the owner or operator of the room/venue/scene.

As mentioned, the robot may determine its route so that the position and area covered by the cleaning element and the disinfecting unit is known or controlled. This may be based on a kinematic model taking into account the manner in which the robot handles, such as which wheel(s) rotate to turn the robot, and what the other wheels (if any) do. In FIG. 3, it is assumed that the robot is propelled by the front wheels 20 which may be individually controlled and where the back wheels 18 are rotatable so as to take into account the movement of the front wheels. In the situation of FIG. 3, the front wheels are controlled to rotate counter-clock-wise around the centre (star) so that the back wheels 18 move counter-clock-wise around the same axis.

This movement of the wheels will cause the cleaning element 16 to move or pass over the floor in a given manner, which may be determined. The same may be said for the disinfecting unit. Thus, the robot route and especially the manner in which it turns may be controlled or logged so that the turn takes place over an area which has already been both cleaned and disinfected, or that the area of this turn is later cleaned and disinfected.

As mentioned, parts of the floor which may not be cleaned due to e.g. the cleaning element positioned below the robot, may actually be disinfected such as if the disinfecting unit as in FIG. 1 is positioned outside of the circumference of the actual robot 12. In the situation of FIG. 1, the robot may actually back up toward an area, such as a corner, so that the disinfecting unit may disinfect the floor in the corner. As mentioned above, disinfection may be possible even without previous cleaning if the dose delivered is sufficiently high.

The following points indicate aspects of the invention:

1. A system for cleaning and disinfecting surfaces, the system comprising a self-propelled unit comprising a surface cleaning element, a surface disinfecting element and a controller, the controller being configured to:
   determine a first area of a surface cleaned by the surface cleaning element, and
   determine a second area of the surface disinfected by the surface disinfecting element.

2. A system according to point 1, wherein the surface cleaning element and the surface disinfecting element are positioned at different positions along direction of movement.

3. A system according to point 1 or 2, wherein the controller is additionally configured to:
   determine that one portion of the surface disinfecting element moves over a surface with a higher velocity than another portion of the disinfecting element and
   varying a velocity of the self-propelled unit vis-à-vis the surface.

4. A system according to any of points 1-3, wherein the disinfecting element is configured to output information relating to an intensity or amount of disinfecting substance or radiation output, the controller being configured to base the determination of the second area on this information.

5. A system according to any of the preceding points, wherein the controller is configured to control movement of the self-propelled unit and control operation of the disinfecting element.

6. A system according to any of the preceding points, wherein the controller is configured to output information relating to the first and second areas.

7. A method of cleaning and disinfecting a surface, the method comprising:
   moving a system according to point 1 over the surface while the surface cleaning element cleans the surface and the surface disinfecting element disinfects the surface and
   during the moving step or subsequent thereto:
   determining a first area of a surface cleaned by the surface cleaning element, and
   determining a second area of the surface disinfected by the surface disinfecting element.

8. A method according to point 7, further comprising the steps of:
   determining that one portion of the surface disinfecting element moves over a surface with a higher velocity than another portion of the disinfecting element and
   varying a velocity of the self-propelled unit vis-à-vis the surface.

9. A method according to any of points 7 and 8, further comprising the step of outputting information relating to an intensity or amount of disinfecting substance or radiation output, wherein the step of determining the second area comprises determining the determination of the second area on this information.

10. A method according to any of points 7-9, further comprising controlling operation of the disinfecting element.

11. A method according to any of points 7-10, further comprising the step of outputting information relating to the first and second areas.

12. An assembly comprising:
    a self-propelled unit having a main direction of movement,
    a surface cleaning element connected to the self-propelled unit,
    a surface disinfecting element detachably connected to the self-propelled unit, the surface disinfecting element connected to the self-propelled unit behind the surface cleaning element in the main direction of movement.

13. An assembly according to point 12, wherein the surface disinfecting element is connected to the self-propelled unit behind the self-propelled unit in the main direction of movement.

14. An assembly according to point 12 or 13, wherein the surface cleaning element comprises one ore more of the group consisting of: a scrubber, a squeegee, a sweeper, and a vacuum unit.

15. An assembly according to any of points 12-14, wherein the surface disinfecting element is configured to output disinfecting radiation.

16. An assembly according to any of points 12-15, wherein the surface disinfecting element comprises:
    a frame attachable to the self-propelled unit and
    a disinfecting portion connected to the frame and configured to disinfect the surface,
    wherein the disinfecting portion is configured to be translated, relative to the frame, in a direction at an angle to the main direction of movement.

17. An assembly according to any of points 12-16, wherein the surface disinfecting element is configured to receive power from the self-propelled unit.

18. An assembly according to any of points 12-16, wherein the surface disinfecting element comprises a power source.

19. An assembly according to any of points 12-18, wherein the surface disinfecting element is configured to receive controlling information from the self-propelled unit and to disinfect the surface accordingly.

20. An assembly according to any of points 12-19, wherein the disinfecting element comprises sensing means for determining a velocity of the disinfecting element vis-à-vis the surface and to control the disinfection of the surface accordingly.

21. An assembly according to point 20, wherein the sensing means are configured to determine the relative velocity of the surface and each of a first and a second portion of the disinfecting element and to control the disinfection of the surface in accordance with the relative velocities.

22. An assembly according to any of points 12-21, wherein the surface disinfecting element is connected to the self-propelled unit so as to not be rotatable to any significant degree around a vertical axis.

23. An assembly according to any of points 12-21, wherein the surface disinfecting element is connected to the self-propelled unit so as to be rotatable around a vertical axis.

24. A method of cleaning and disinfecting a surface, the method comprising moving an assembly according to point 12 over the surface while the surface cleaning element cleans the surface and the surface disinfecting element disinfects the surface.

25. A method according to point 24, comprising the initial step of connecting the disinfecting element to the self-propelled unit behind the self-propelled unit in the main direction of movement.

26. A method according to point 24 or 25, wherein the cleaning step comprises one or more of the group consisting of: a scrubbing step, a step of sucking liquid from the surface, a sweeping step, and a vacuuming step.

27. A method according to any of points 24-26, wherein the surface disinfecting step comprises outputting disinfecting radiation.

28. A method according to any of points 24-27, wherein the surface disinfecting element comprises:
a frame attachable to the self-propelled unit and
a disinfecting portion connected to the frame and configured to disinfect the surface,
the method further comprising the step of translating the disinfecting portion, relative to the frame, in a direction at an angle to the main direction of movement.

29. A method according to any of points 24-28, further comprising the step of the surface disinfecting element receiving power from the self-propelled unit.

30. A method according to any of points 24-28, further comprising the step of a disinfecting portion of the disinfecting element receiving power from a power source of the disinfecting element.

31. A method according to any of points 24-30, further comprising the step of the surface disinfecting element receiving controlling information from the self-propelled unit and disinfecting the surface accordingly.

32. A method according to any of points 24-31, further comprising the step of the disinfecting element determining a velocity of the disinfecting element vis-à-vis the surface and controlling the disinfection of the surface accordingly.

33. A method according to point 32, further comprising the step of determining the relative velocity of the surface and each of a first and a second portion of the disinfecting element and controlling the disinfection of the surface in accordance with the relative velocities.

34. A method according to any of points 24-33, further comprising the step of preventing the surface disinfecting element from rotation, relative to the self-propelled unit, to any significant degree around a vertical axis.

35. A method according to any of points 24-33, further comprising the step of the surface disinfecting element rotating, relative to the self-propelled unit, around a vertical axis.

36. An assembly of a self-propelled unit and a disinfecting element, wherein the assembly comprises a determining element configured to determine a velocity of the disinfecting element over a surface and for controlling the disinfection of the disinfecting element on the basis of a determined velocity.

37. An assembly according to point 36, wherein the self-propelled unit comprises one or more sensors for detecting obstacles and wherein the determining element is configured to instruct the disinfecting element to stop disinfecting when the self-propelled unit stops due to a detected obstacle.

38. A method of operating an assembly of a self-propelled unit and a disinfecting element to disinfect a surface, the method comprising determining a velocity of the disinfecting element over the surface and controlling the disinfection of the disinfecting element on the basis of a determined velocity.

39. A method according to point 38, further comprising the steps of self-propelled unit detecting an obstacle and the disinfecting element to stop disinfecting.

40. An assembly comprising:
a self-propelled unit having:
an instruction outputting element for outputting wireless instructions and
a surface cleaning element,
a surface disinfecting element detachably connected to the self-propelled unit and comprising:
a power source and
a receiver for receiving wireless information from the instruction outputting element and for controlling the disinfecting operation of the disinfecting element based on wireless instructions received.

41. A method of operating an assembly comprising:
a self-propelled unit having:
an instruction outputting element for outputting instructions and
a surface cleaning element,
a surface disinfecting element detachably connected to the self-propelled unit and comprising:
a power source and
a receiver for receiving information and for controlling the disinfecting operation,
the method comprising the steps of:
the instruction outputting element outputting wireless instructions,
the receiver receiving the wireless instructions and controlling the disinfecting operation in accordance with the instructions.

42. A method of determining a path for a self-propelled unit comprising a surface cleaning element and a surface disinfecting element for cleaning and disinfecting a surface, the method comprising determining the path so that both the cleaning element and the disinfecting element cover at least 90% of an area of the surface.

43. A method according to point 42, wherein the path is determined so that both the cleaning element and the disinfecting element cover at least 95% of an area of the surface.

44. A method according to point 42 or 43, further comprising controlling the unit to follow the path.

The invention claimed is:

1. A system for cleaning and disinfecting surfaces, the system comprising:
a self-propelled unit comprising
wheels, sliders, tracks, or legs for allowing movement of the self-propelled unit over a surface,
a surface cleaning element, and
a surface disinfecting element,
the surface cleaning element and the surface disinfecting element being positioned at different positions along a direction of the movement of the self-propelled unit over the surface, wherein the self-propelled unit is configured such that the area covered by the surface cleaning element and the area covered by the surface disinfecting element are different when the self-propelled unit turns; and
a controller including circuitry and/or a processor configured to control the movement of the self-propelled unit over the surface, control operation of the surface cleaning element, and control operation of the surface disinfecting element, wherein the controller is configured, based on information as to a relative position of the surface cleaning element and the surface disinfecting element relative to the wheels, sliders, tracks or legs, to
   determine a path of the self-propelled unit,
   control the self-propelled unit to travel along the path whilst simultaneously operating the surface cleaning element and the surface disinfecting element,
   determine a first area of a surface, the first area of the surface being the area of the surface cleaned by the surface cleaning element while traveling the path,
   determine a second area of the surface, the second area of the surface being the area of the surface disinfected by the surface disinfecting element while traveling the path,
   determine a difference between the first area and the second area, and
   adjust movement of the self-propelled unit, a velocity of the self-propelled unit, operation of the surface cleaning element, and/or operation of the disinfecting element, based on the difference between the first area and the second area, to ensure that predetermined portions of the surface receive at least a minimum level of disinfection.

2. The system according to claim 1, wherein the disinfecting element is configured to output information relating to an intensity or amount of disinfecting substance or radiation output, the controller being configured to base the determination of the second area on this information.

3. The system according to claim 1, wherein the controller is configured to control movement of the self-propelled unit and control operation of the disinfecting element.

4. The system according to claim 1, wherein the controller is configured to output information relating to the first and second areas.

5. The system according to claim 1, wherein the surface disinfecting element is detachably connected to the surface cleaning element.

6. The system according to claim 1, wherein the controller is configured to adjust movement of the self-propelled unit comprising the controller tracking a third area, wherein the third area is the difference between the first area and the second area, and amending the path to visit the third area.

7. A method of cleaning and disinfecting a surface, the method comprising:
   moving a system according to claim 1 over the surface while the surface cleaning element cleans the surface and the surface disinfecting element disinfects the surface; and
   during the moving step:
      determining a path of the self-propelled unit,
      controlling the self-propelled unit to travel along the path whilst simultaneously operating the surface cleaning element and the surface disinfecting element,
      determining, based on the information as to the relative position of the surface cleaning element relative to the wheels, sliders, tracks or legs, a first area of a surface cleaned by the surface cleaning element while travelling the path, the first area of the surface being the area of the surface,
      determining, based on the information as to the relative position of the surface disinfecting element relative to the wheels, sliders, tracks or legs, a second area of the surface disinfected by the surface disinfecting element while travelling the path, the second area of the surface being the area of the surface,
      determining a difference between the first area and the second area, and
      adjusting movement of the self-propelled unit, a velocity of the self-propelled unit, operation of the surface cleaning element, and/or operation of the disinfecting element, based on the difference between the first area and the second area, to ensure that predetermined portions of the surface receive at least a minimum level of disinfection.

8. The method according to claim 7, further comprising the step of outputting information relating to an intensity or amount of disinfecting substance or radiation output, wherein the step of determining the second area comprises determining the determination of the second area on this information.

9. The method according to claim 7, further comprising the step of outputting information relating to the first and second areas.

10. The method according to claim 7, further comprising controlling operation of the disinfecting element.

11. An assembly comprising:
   a self-propelled unit having a main direction of movement, the self-propelled unit including wheels, sliders, tracks, or legs for allowing movement of the self-propelled unit over a surface,
   a surface cleaning element connected to the self-propelled unit,
   a surface disinfecting element detachably connected to the self-propelled unit, the surface disinfecting element connected to the self-propelled unit behind the surface cleaning element in the main direction of the movement of the self-propelled unit over the surface, wherein the self-propelled unit is configured such that the area covered by the surface cleaning element and the area covered by the surface disinfecting element are different when the self-propelled unit turns,
wherein the assembly further comprises a controller that includes circuitry and/or a processor configured to control the movement of the self-propelled unit over the surface, control operation of the surface cleaning element, and control operation of the surface disinfecting element,
wherein the controller is configured, based on information as to a relative position of the surface cleaning element and the surface disinfecting element relative to the wheels, sliders, tracks or legs, to
   determine a path of the self-propelled unit,
   control the self-propelled unit to travel along the path whilst simultaneously operating the surface cleaning element and the surface disinfecting element,
   determine a first area of a surface, the first area of the surface being the area of the surface cleaned by the surface cleaning element while traveling the path,
   determine a second area of the surface, the second area of the surface being the area of the surface disinfected by the surface disinfecting element while traveling the path,
   determine a difference between the first area and the second area, and
   adjusting movement of the self-propelled unit, a velocity of the self-propelled unit, operation of the surface cleaning element, and/or operation of the disinfecting element, based on the difference between the first area and the second area, to ensure that predetermined portions of the surface receive at least a minimum level of disinfection.

12. The assembly according to claim 11, wherein the surface disinfecting element is connected to the self-propelled unit behind the self-propelled unit in the main direction of movement.

13. The assembly according to claim 11, wherein the surface disinfecting element comprises:
a frame attachable to the self-propelled unit and
a disinfecting portion connected to the frame and configured to disinfect the surface,
wherein the disinfecting portion is configured to be translated, relative to the frame, in a direction at an angle to the main direction of movement.

14. A method of cleaning and disinfecting a surface, the method comprising:
moving an assembly according to claim 11 over the surface while the surface cleaning element cleans the surface and the surface disinfecting element disinfects the surface; and
during the moving step:
determining a path of the self-propelled unit,
controlling the self-propelled unit to travel along the path whilst simultaneously operating the surface cleaning element and the surface disinfecting element,
determining, based on the information as to the relative position of the surface cleaning element relative to the wheels, sliders, tracks or legs, a first area of a surface cleaned by the surface cleaning element while travelling the path, the first area of the surface being the area of the surface,
determining, based on the information as to the relative position of the surface disinfecting element relative to the wheels, sliders, tracks or legs, a second area of the surface disinfected by the surface disinfecting element while travelling the path, the second area of the surface being the area of the surface,
determining a difference between the first area and the second area, and
adjusting movement of the self-propelled unit, a velocity of the self-propelled unit, operation of the surface cleaning element, and/or operation of the disinfecting element, based on the difference between the first area and the second area, to ensure that predetermined portions of the surface receive at least a minimum level of disinfection.

15. The method according to claim 14, comprising the initial step of connecting the disinfecting element to the self-propelled unit behind the self-propelled unit in the main direction of movement.

16. The method according to claim 14, wherein the surface disinfecting element comprises:
a frame attachable to the self-propelled unit and
a disinfecting portion connected to the frame and configured to disinfect the surface, and
the method further comprising the step of translating the disinfecting portion, relative to the frame, in a direction at an angle to the main direction of movement.

17. The method according to claim 14, further comprising the step of the surface disinfecting element receiving power from the self-propelled unit.

18. The method according to claim 14, further comprising the step of a disinfecting portion of the disinfecting element receiving power from a power source of the disinfecting element.

19. The method according to claim 14, further comprising the step of the surface disinfecting element receiving controlling information from the self-propelled unit and disinfecting the surface accordingly.

20. An assembly comprising:
a self-propelled unit including wheels, sliders, tracks, or legs for allowing movement of the self-propelled unit over a surface;
a surface disinfecting element;
a surface cleaning element, the surface cleaning element and the surface disinfecting element being positioned at different positions along a direction of the movement of the self-propelled unit over the surface, wherein the self-propelled unit is configured such that the area covered by the surface cleaning element and the area covered by the surface disinfecting element are different when the self-propelled unit turns;
a determining element configured to determine information as to a relative position of the surface cleaning element and the surface disinfecting element relative to the wheels, sliders, tracks or legs; and
a controller including circuitry and/or a processor configured to control the movement of the self-propelled unit over the surface, control operation of the surface cleaning element, and control operation of the surface disinfecting element,
wherein the controller is configured, based on information as to a relative position of the surface cleaning element and the surface disinfecting element relative to the wheels, sliders, tracks or legs, to
determine a path of the self-propelled unit,
control the self-propelled unit to travel along the path whilst simultaneously operating the surface cleaning element and the surface disinfecting element,
determine a first area of a surface, the first area of the surface being the area of the surface cleaned by the surface cleaning element while traveling the path,
determine a second area of the surface, the second area of the surface being the area of the surface disinfected by the surface disinfecting element while traveling the path,
determine a difference between the first area and the second area, and
adjusting movement of the self-propelled unit, a velocity of the self-propelled unit, operation of the surface cleaning element, and/or operation of the disinfecting element, based on the difference between the first area and the second area, to ensure that predetermined portions of the surface receive at least a minimum level of disinfection.

21. The assembly according to claim 20, wherein the self-propelled unit comprises one or more sensors for detecting obstacles and wherein the determining element is configured to instruct the disinfecting element to stop disinfecting when the self-propelled unit stops due to a detected obstacle.

22. A method of operating an assembly according to claim 21, the method comprising:
moving the assembly over a surface while the surface cleaning element cleans the surface and the surface disinfecting element disinfects the surface; and
during the moving step:
determining a path of the self-propelled unit,
controlling the self-propelled unit to travel along the path whilst simultaneously operating the surface cleaning element and the surface disinfecting element,
determining, based on the information as to the relative position of the surface cleaning element relative to the wheels, sliders, tracks or legs, a first area of a surface cleaned by the surface cleaning element while travelling the path, the first area of the surface being the area of the surface, determining, based on the information as to the relative position of the surface disinfecting element relative to the wheels, sliders, tracks or legs, a second area of the surface disinfected by the surface disinfecting element while travelling the path, the second area of the surface being the area of the surface, determining a difference between the first area and the second area, and adjusting movement of the self-propelled unit, a velocity of the self-propelled unit, operation of the surface cleaning element, and/or operation of the disinfecting element, based on the difference between the first area and the second area, to ensure that predetermined portions of the surface receive at least a minimum level of disinfection.

23. An assembly comprising:

a self-propelled unit including:
   wheels, sliders, tracks, or legs for allowing movement of the self-propelled unit over a surface,
   an instruction outputting element for outputting wireless instructions, and
   a surface cleaning element;

a surface disinfecting element detachably connected to the self-propelled unit, the surface disinfecting element comprising:
   a power source and
   a receiver for receiving wireless information from the instruction outputting element and for controlling the disinfecting operation of the disinfecting element based on wireless instructions received wherein the surface cleaning element and the surface disinfecting element being positioned at different positions along a direction of the movement of the self-propelled unit over the surface, wherein the self-propelled unit is configured such that the area covered by the surface cleaning element and the area covered by the surface disinfecting element are different when the self-propelled unit turns; and a controller including circuitry and/or a processor configured to control the movement of the self-propelled unit over the surface, control operation of the surface cleaning element, and control operation of the surface disinfecting element, wherein the controller is configured, based on information as to a relative position of the surface cleaning element and the surface disinfecting element relative to the wheels, sliders, tracks or legs, to determine a path of the self-propelled unit, control the self-propelled unit to travel along the path whilst simultaneously operating the surface cleaning element and the surface disinfecting element, determine a first area of a surface, the first area of the surface being the area of the surface cleaned by the surface cleaning element while traveling the path, determine a second area of the surface, the second area of the surface being the area of the surface disinfected by the surface disinfecting element while traveling the path, determine a difference between the first area and the second area, and adjust movement of the self-propelled unit, a velocity of the self-propelled unit, operation of the surface cleaning element, and/or operation of the disinfecting element, based on the difference between the first area and the second area, to ensure that predetermined portions of the surface receive at least a minimum level of disinfection.

24. A method of operating an assembly according to claim 23, the method comprising the steps of:
   moving the assembly over a surface while the surface cleaning element cleans the surface and the surface disinfecting element disinfects the surface; and
   during the moving step:
      determining a path of the self-propelled unit,
      controlling the self-propelled unit to travel along the path whilst simultaneously operating the surface cleaning element and the surface disinfecting element,
      determining, based on the information as to the relative position of the surface cleaning element relative to the wheels, sliders, tracks or legs, a first area of a surface cleaned by the surface cleaning element while travelling the path, the first area of the surface being the area of the surface,
      determining, based on the information as to the relative position of the surface disinfecting element relative to the wheels, sliders, tracks or legs, a second area of the surface disinfected by the surface disinfecting element while travelling the path, the second area of the surface being the area of the surface,
      determining a difference between the first area and the second area,
      adjusting movement of the self-propelled unit, a velocity of the self-propelled unit, operation of the surface cleaning element, and/or operation of the disinfecting element, based on the difference between the first area and the second area, to ensure that predetermined portions of the surface receive at least a minimum level of disinfection,
      the instruction outputting element outputting wireless instructions, and
      the receiver receiving the wireless instructions and controlling the disinfecting operation in accordance with the instructions.

25. A system for cleaning and disinfecting surfaces, the system comprising:

a self-propelled unit comprising
   wheels, sliders, tracks, or legs for allowing movement of the self-propelled unit over a surface,
   a surface cleaning element, and
   a surface disinfecting element, the surface cleaning element and the surface disinfecting element being positioned at different positions along a direction of the movement of the self-propelled unit over the surface, wherein the self-propelled unit is configured such that the area covered by the surface cleaning element and the area covered by the surface disinfecting element are different when the self-propelled unit turns; and a controller including circuitry and/or a processor configured to control movement of the self-propelled unit over the surface, control operation of the surface cleaning element, and control operation of the surface disinfecting element, wherein the controller is configured, based on information as to a relative position of the surface cleaning element and the surface disinfecting element relative to the wheels, sliders, tracks or legs, to determine a first area of a surface, the first area of the surface being the area of the surface cleaned by the surface cleaning element while traveling the path, determine a second area of the surface, the second area of the surface being the area of the surface disinfected by the surface disinfecting element while traveling the path, determine a difference between the first area and the second area, and drive the self-propelled unit along said path at a lower velocity when the disinfecting element disinfects part of the surface which has not been cleaned by the surface cleaning element or has not received at least a minimum level of cleaning.

26. A system according to claim 25, wherein the controller is configured to have the self-propelled unit move in a main direction of movement and wherein the surface cleaning element is positioned so as to clean the surface before the surface disinfecting element disinfects the surface when the self-propelled unit moves in the main direction of movement.

27. A system for cleaning and disinfecting surfaces, the system comprising:
  a self-propelled unit comprising
    wheels, sliders, tracks, or legs for allowing movement of the self-propelled unit over a surface,
    a surface cleaning element, and
    a surface disinfecting element, the surface cleaning element and the surface disinfecting element being positioned at different positions along a direction of the movement of the self-propelled unit over the surface, wherein the self-propelled unit is configured such that the area covered by the surface cleaning element and the area covered by the surface disinfecting element are different when the self-propelled unit turns; and
  a controller including circuitry and/or a processor configured to control movement of the self-propelled unit over the surface, control operation of the surface cleaning element, and control operation of the surface disinfecting element,
  wherein the controller is configured, based on information as to a relative position of the surface cleaning element and the surface disinfecting element relative to the wheels, sliders, tracks or legs, to
    determine a route of the self-propelled unit,
    control the self-propelled unit to travel along the route whilst simultaneously operating the surface cleaning element and the surface disinfecting element,
    determine a first area of a surface, the first area of the surface being the area of the surface cleaned by the surface cleaning element while traveling the route,
    determine a second area of the surface, the second area of the surface being the area of the surface disinfected by the surface disinfecting element while traveling the route,
    track portions of the surface not forming part of both the first and second area, and
    control the self-propelled unit to move along the route so that all predetermined portions of the surface form part of both the first area and the second area.

28. A system for cleaning and disinfecting surfaces, the system comprising:
  a self-propelled unit comprising
    wheels, sliders, tracks, or legs for allowing movement of the self-propelled unit over a surface,
    a surface cleaning element, and
    a surface disinfecting element,
      the surface cleaning element and the surface disinfecting element being positioned at different positions along a direction of the movement of the self-propelled unit over the surface, wherein the self-propelled unit is configured such that the area covered by the surface cleaning element and the area covered by the surface disinfecting element are different when the self-propelled unit turns; and
  a controller including circuitry and/or a processor configured to control the movement of the self-propelled unit over the surface, control operation of the surface cleaning element, and control operation of the surface disinfecting element,
  wherein the controller is configured, based on information as to a relative position of the surface cleaning element and the surface disinfecting element relative to the wheels, sliders, tracks or legs, to
    determine a path of the self-propelled unit, based on a kinematic model of the self-propelled unit, such that all predetermined portions of the surface are covered by both the cleaning element and the disinfecting unit,
    determine a first area of a surface, the first area of the surface being the area of the surface cleaned by the surface cleaning element while traveling the path,
    determine a second area of the surface, the second area of the surface being the area of the surface disinfected by the surface disinfecting element while traveling the path, and
    control the self-propelled unit to travel along the path whilst simultaneously operating the surface cleaning element and the surface disinfecting element.

29. The system according to claim 28, wherein the disinfecting element is configured to output information relating to an intensity or amount of disinfecting substance or radiation output, and the controller is configured to base the determination of the second area on this information.

30. The system according to claim 28, wherein the controller is further configured to control movement of the self-propelled unit and control operation of the disinfecting element.

31. The system according to claim 28, wherein the controller is further configured to output information relating to the first and second areas.

32. A method of cleaning and disinfecting a surface using a self-propelled unit, the method comprising:
  moving the self-propelled unit over the surface, the self-propelled unit comprising:
    wheels, sliders, tracks, or legs for allowing movement of the self-propelled unit over the surface,
    a surface cleaning element, and
    a surface disinfecting element, the surface cleaning element and the surface disinfecting element being positioned at different positions along a direction of movement of the self-propelled unit over the surface, wherein the self-propelled unit is configured such that the area covered by the surface cleaning element and the area covered by the surface disinfecting element are different when the self-propelled unit turns;
  controlling the movement of the self-propelled unit, operation of the surface cleaning element, and operation of the surface disinfecting element using a controller including circuitry and/or a processor;

determining a path of the self-propelled unit based on a kinematic model of the self-propelled unit such that all predetermined portions of the surface are covered by both the surface cleaning element and the surface disinfecting element;

determining a first area of the surface cleaned by the surface cleaning element, while travelling along the path;

determining, a second area of the surface disinfected by the surface disinfecting element while travelling along the path; and controlling the self-propelled unit to travel along the path whilst simultaneously operating the surface cleaning element and the surface disinfecting element.

33. The method according to claim 32, further comprising outputting information relating to an intensity or amount of disinfecting substance or radiation output, wherein the step of determining the second area comprises determining the second area based on this information.

* * * * *